United States Patent
Eromaki

(10) Patent No.: US 9,883,016 B2
(45) Date of Patent: Jan. 30, 2018

(54) METHOD AND APPARATUS FOR PORTABLE DEVICE ACCESSORIES

(71) Applicant: Nokia Corporation, Espoo (FI)

(72) Inventor: Marko Eromaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 14/188,745

(22) Filed: Feb. 25, 2014

(65) Prior Publication Data

US 2015/0237994 A1 Aug. 27, 2015

(51) Int. Cl.
*H04M 1/02* (2006.01)
*G03B 17/56* (2006.01)

(52) U.S. Cl.
CPC ........ *H04M 1/0254* (2013.01); *G03B 17/565* (2013.01); *G03B 17/566* (2013.01); *H04M 1/0264* (2013.01); *Y10T 24/316* (2015.01)

(58) Field of Classification Search
CPC .... A45F 5/00; A45F 2005/002; Y10T 24/316; Y10T 24/31; Y10T 24/314; Y10T 24/318; Y10T 24/1394; Y10T 24/1397; Y10T 24/22; Y10T 24/23; Y10T 24/3439; H04M 1/0254; H04M 1/0264; G03B 17/565; G03B 17/566
USPC ................... 24/301; 396/544; 224/250, 247; 220/375
See application file for complete search history.

(56) References Cited

U.S. PATENT DOCUMENTS

| | | | | |
|---|---|---|---|---|
| 1,736,220 A * | 11/1929 | Robertson | ........... | G03B 19/023 396/337 |
| 1,855,345 A * | 4/1932 | Fischer, Jr. | ........... | A43C 11/22 36/58.5 |
| 3,283,433 A * | 11/1966 | Navarino | .................. | G09F 3/00 24/301 |
| 3,961,349 A * | 6/1976 | Forsyth | .................. | G03B 17/56 396/529 |
| 4,133,080 A * | 1/1979 | Kuk | ......................... | A45F 5/12 24/301 |
| 4,666,274 A * | 5/1987 | Maeno | .................. | G03B 17/08 396/29 |
| 5,805,944 A * | 9/1998 | Barclay | ................ | G03B 11/043 359/511 |
| 6,151,172 A * | 11/2000 | Ferraro | ................ | G02B 25/005 345/8 |

(Continued)

FOREIGN PATENT DOCUMENTS

CA     2230360 A1    9/1998
CN     202533640     11/2012

(Continued)

OTHER PUBLICATIONS

"Incredible DIY iPhone Macro", Aug. 11, 2012, 3 pgs. www.instrucables.com.

(Continued)

*Primary Examiner* — Abigail Troy
(74) *Attorney, Agent, or Firm* — Harrington & Smith

(57) ABSTRACT

An apparatus including two user separable and joinable clips; and a retractable clip tensioner configured to enable a user to attach the apparatus against a side of a portable device by expanding and engaging the clips against different sides of the portable device so that the retractable clip tensioner maintains the clips engaged.

18 Claims, 3 Drawing Sheets

(56) References Cited

U.S. PATENT DOCUMENTS

| | | | | |
|---|---|---|---|---|
| 6,275,333 B1* | 8/2001 | Shaffer | ................ | G02B 25/002 |
| | | | | 359/440 |
| 6,307,686 B1* | 10/2001 | Ferraro | ................ | G02B 25/005 |
| | | | | 345/8 |
| 8,385,004 B2* | 2/2013 | Hicks | ..................... | G03B 41/00 |
| | | | | 359/699 |
| 8,424,825 B2* | 4/2013 | Somuah | .............. | B60R 11/0235 |
| | | | | 248/130 |
| 2009/0181729 A1 | 7/2009 | Griffin, Jr. et al. | ........ | 455/575.1 |
| 2012/0018595 A1* | 1/2012 | Berry | ...................... | A45F 5/021 |
| | | | | 248/121 |
| 2012/0246879 A1* | 10/2012 | Pestal | .................. | A47B 23/002 |
| | | | | 24/3.2 |
| 2013/0107109 A1 | 5/2013 | Yang | ............................ | 348/373 |
| 2013/0298313 A1 | 11/2013 | Mack | | |
| 2015/0020352 A1* | 1/2015 | Funger | ................ | A47C 21/022 |
| | | | | 24/301 |
| 2015/0028071 A1* | 1/2015 | Brillon, Jr. | .............. | A45F 5/021 |
| | | | | 224/247 |

FOREIGN PATENT DOCUMENTS

| | | | |
|---|---|---|---|
| GB | 2409050 A | 6/2005 | |
| JP | 2002/368854 A | 12/2002 | |

OTHER PUBLICATIONS

"Microscope Lens for Smartphones", Feb. 2014, 2 pgs., www.digitech-i.com.

A search report has issued in a counterpart foreign application (EP 15 15 5676), dated Jul. 8, 2015.

\* cited by examiner

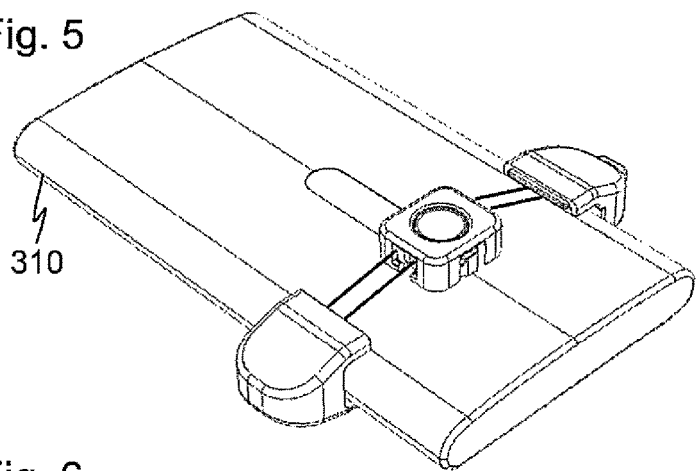
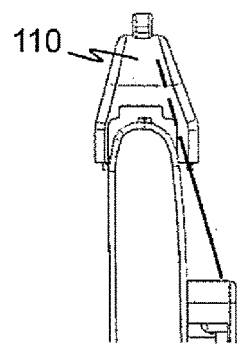
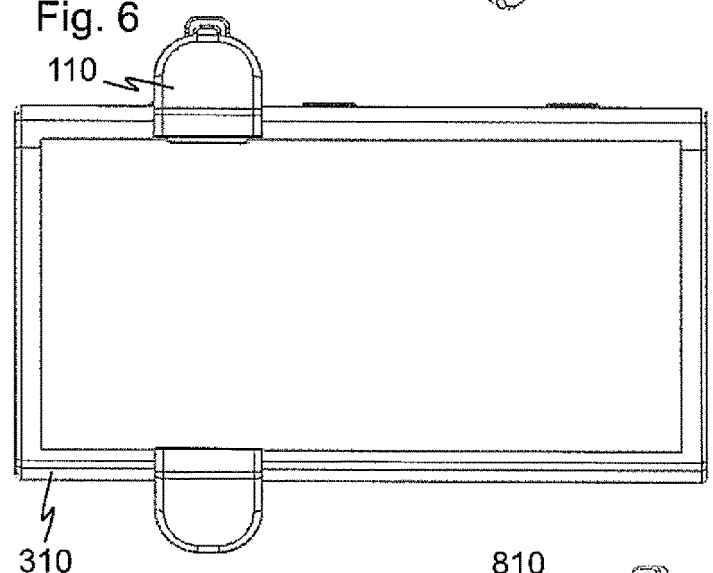
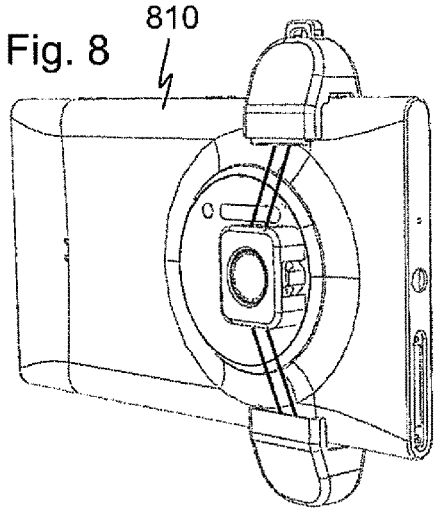

METHOD AND APPARATUS FOR PORTABLE DEVICE ACCESSORIES

TECHNICAL FIELD

The present application generally relates to portable device accessories.

BACKGROUND

This section illustrates useful background information without admission of any technique described herein representative of the state of the art.

Portable devices of different types are used in modern societies for various purposes such as communications, entertainment, imaging and navigation. Some devices can be further enhanced or their use be facilitated by physical accessories such as add-on lenses, replaceable color covers or even smart covers that provide a portable device, when attached, with new features or functionalities such as a near field communication circuitry or wireless charging capability.

As the number of various items used by a person increases, it is increasingly more difficult to access at sudden need a given one. Therefore, different accessories are integrated with portable devices as much as possible. For example, some very high-end camera phone model contains a built-in neutral density (ND) filter that is automatically used in excessive ambient light to increase the exposure time when the optics would otherwise be too fast or when a longer exposure time would produce more pleasing effects in photographs.

SUMMARY

Various aspects of examples of the invention are set out in the claims.

According to a first example aspect of the present invention there is provided an apparatus comprising:

two user separable and joinable clips; and
a retractable clip tensioner configured to enable a user to attach the apparatus against a side of a portable device by expanding and engaging the clips against different sides of the portable device so that the retractable clip tensioner maintains the clips engaged.

The different sides may be opposite sides. The side of the portable device against which the apparatus is attached may reside between the different sides. The side of the portable device against which the apparatus is attached may be substantially perpendicular to at least one of the different sides. The side of the portable device against which the apparatus is attached may have substantially greater surface area than the different sides.

The clips may be configured to collectively form, when joined, a storage space. The clips may be configured to cover the storage space on two opposite sides.

The apparatus may be configured to cover an accessory device. The covering may be configured to provide a protected storage for the accessory device.

The apparatus may further comprise an accessory device holder configured to mechanically inter-connect the accessory device with the retractable clip tensioner.

The apparatus may further comprise the accessory device. The accessory device may be configured to co-operate with the portable device. At least one of the retractable clip tensioner and the accessory device may be configured to enable adjustable attachment of the accessory device to the retractable clip tensioner. The apparatus may further comprise the accessory device holder configured to enable adjustable attachment of the accessory device to the retractable clip tensioner.

The clips may comprise a concave forms configured to sandwich the portable device when the clips are expanded and engaged against the different sides of the portable device. The clips may have a C or J shaped profile. The accessory device may be configured to form with the clips a closed exterior surface when the clips are joined and the accessory device is contained in the storage space. The clips may be configured to operate as clamps or hooks when engaged to the portable device.

The retractable clip tensioner may comprise an elastic member. The elastic member may comprise one or more of: an elastic band; a spring; a string; a magnet; and a pressurized bag. The elastic member may comprise more than 50% of its weight of any of: rubber; synthetic rubber; silicone rubber; and spring steel. The elastic member may comprise a stretching member. The stretching member may be length-adjustable.

The retractable clip tensioner may be further configured to enable user adjustable positioning of the accessory device at different positions along the retractable clip tensioner. The retractable clip tensioner may be further configured to enable user adjustable positioning of the accessory device at different positions by sliding the accessory device along the retractable clip tensioner. The retractable clip tensioner may be further configured to inhibit free sliding of the clip tensioner. Free sliding may refer to sliding in normal use as function of gravity and accelerations invoked by normal use.

The accessory device may comprise a functional part. The functional part may be configured to provide a new function or to facilitate the use of an existing function of the portable device. The functional part may be an add-on part. The functional part may be configured to co-operate with a camera lens of the portable device. The functional part may comprise one or more elements selected from a group consisting of: an objective; an optical filter; a neutral density filter; a gradient filter; a polarizing filter; a light guide configured to pass flash light; a mirror or prism configured to guide flash light; optically transparent gel configured to facilitate objective tilting; an objective cover; a sun glare protector; a touch screen stylus; a spare part for the retractable clip tensioner; an input device; and a joystick.

The accessory device may be configured to enable attaching the functional part at adjustable distance from the portable device. The accessory device may be configured to hold the functional part in a user selectable orientation. The accessory device may be configured to be attachable to the portable device in a respectively user selectable orientation so that the distance of the functional part from the portable device is user adjustable by adjusting the orientation of the accessory device with respect to the portable device.

The accessory device may comprise a user replaceable add-on parts. The accessory device may comprise storage positions for holding additional add-on parts.

Any one or more of the clips may be formed of plastics; metal; composite material; glass; rubber; and any combination thereof. One or more of the clips may be transparent. One or more of the clips may be formed by molding. One or more of the clips may be formed by injection molding.

One or more of the clips may be configured to leave a space for a key or button on the side of the portable device to avoid undesirably acting on the key or button when the clip is engaged against the side of the portable device at the key or button. Alternatively or additionally the apparatus may be configured to enable diagonal use of the retractable clip tensioner so as to enable a user to engage the clip against the side of the portable device at a position in which the key or button is not covered by the clip and to enable correct positioning of the accessory device by suitably positioning a clip on another side of the portable device. The clips may comprise a friction enhancing shape to inhibit sideways slipping. Alternatively or additionally, the clips may be shaped to wedge against the side of the portable device to inhibit sideways slipping.

The apparatus may be configured to enable attaching the portable device to another object. The another object may be selected from a group consisting of: a camera cradle; a neck strap; a car cradle; and a table-top device holder.

The apparatus may be configured to enable attaching the accessory device to a variety of different models of portable devices. The portable device may be freely selected from two or more devices of: mobile telephones; personal digital assistants; digital cameras; tablet computers; laptop computers; game devices; and navigation devices. The portable device may be a handheld device. The portable device may be a battery operated device. The portable device may be a wireless communication device.

According to a second example aspect of the present invention, there is provided a system comprising the apparatus of the first example aspect and the portable device.

According to a third example aspect of the present invention, there is provided a method comprising:
  maintaining two user separable clips joined;
  allowing a user to separate and engage the clips against different sides of the portable device; and
  maintaining tension between the clips so as to maintain the clips engaged.

The method may further comprise holding an accessory device attached against the portable device.

The method may further comprise enabling the user to adjust positioning of the accessory device against the portable device.

The method may further comprise inhibiting free movement of the accessory device out of its adjusted position.

The maintaining of the tension may be performed using a stretching band. The stretching band may be configured to slide through or around the accessory device when the user adjust the positioning of the accessory device so as to allow lengthwise adjustment and to generate desired restraining force (e.g. due to friction and compression of the band).

According to a fourth example aspect of the present invention, there is provided an apparatus comprising:
  two user separable and joinable clip means; and
  means for retractable clip tensioning configured to enable a user to attach the apparatus against a side of a portable device by expanding and engaging the clip means against different sides of the portable device so that the means for retractable clip tensioning maintains the clips engaged.

According to a fifth example aspect of the present invention, there is provided an apparatus comprising:
  means for maintaining two user separable clips joined;
  means for allowing a user to separate and engage the clips against different sides of the portable device; and
  means for maintaining tension between the clips so as to maintain the clips engaged.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 5 shows an illustration of a system of a first portable device and the apparatus of FIG. 1, when seen diagonally from a rear-side of the first portable device;

FIG. 6 shows an illustration of the system of FIG. 5, when seen from a front-side of the first portable device;

FIG. 7 shows an illustration of a top portion of the system of FIG. 5, when seen from side of the first portable device;

FIG. 8 shows an illustration of a system of a second portable device and the apparatus of FIG. 1, when seen diagonally from a rear-side of the first portable device.

DETAILED DESCRIPTION OF THE DRAWINGS

An example embodiment of the present invention and its potential advantages are understood by referring to FIGS. 1 through 9 of the drawings. In this document, like reference signs denote like parts or steps.

Figure 1:
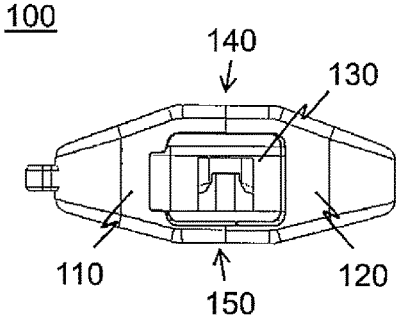
FIG. 1 shows an illustration of an apparatus of an example embodiment of the invention in a compacted configuration.

FIG. 1 shows an illustration of an apparatus 100 of an example embodiment of the invention in a compacted configuration. The apparatus 100 comprises two user separable and joinable clips 110, 120. In an example embodiment, the clips 110, 120 are further configured to collectively form, when joined, a storage space. In an example embodiment, the clips 110, 120 are configured to cover, when joined, the storage space on two opposite sides 140, 150.

Figure 2:
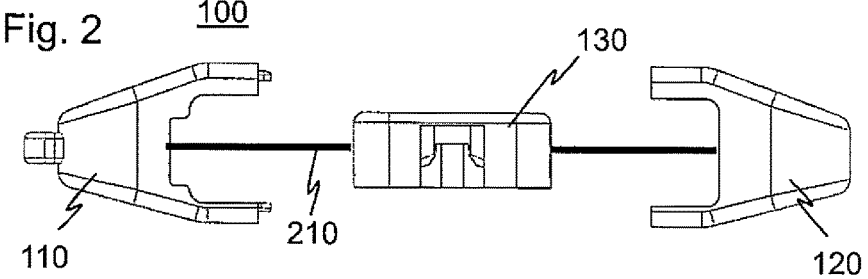
FIG. 2 shows an illustration of the apparatus of FIG. 1 in an expanded configuration.

FIG. 2 shows an illustration of the apparatus 100 of FIG. 1 in an open or expanded configuration in which the clips 110, 120 are separated. The apparatus further comprises a retractable clip tensioner 210 configured to enable a user to attach the apparatus 100 against a side of a portable device by separating and engaging the clips against different sides of the portable device so that the retractable clip tensioner maintains the clips engaged.

FIGS. 1 and 2 further show an accessory device holder 130 configured to mechanically inter-connect an accessory device with the retractable clip tensioner 210. As shown in FIGS. 1 and 2, the different sides can be opposite sides. In another example embodiment with three or more clips, the different sides need not be opposite if e.g. the portable device has a triangular or pentagon shape. Moreover, as appears e.g. in FIGS. 3 to 6 and 8, the side of the portable device against which the apparatus is attached may reside between the different sides against which the clips are engaged. Further, these FIGS. 3 to 6 and 8 exemplify that the side of the portable device against which the apparatus is attached can be substantially perpendicular to at least one of the different sides. With rounded side shown in these FIGS.

3 to 6 and 8 there may be no clear plane of the side in question, but one can consider, for understanding the perpendicularity of sides of the portable device, the direction of a side as its average plane as if the side were not rounded at all. Moreover, in an example embodiment, the side of the portable device against which the apparatus is attached has substantially greater surface area than the different sides.

Figure 3:
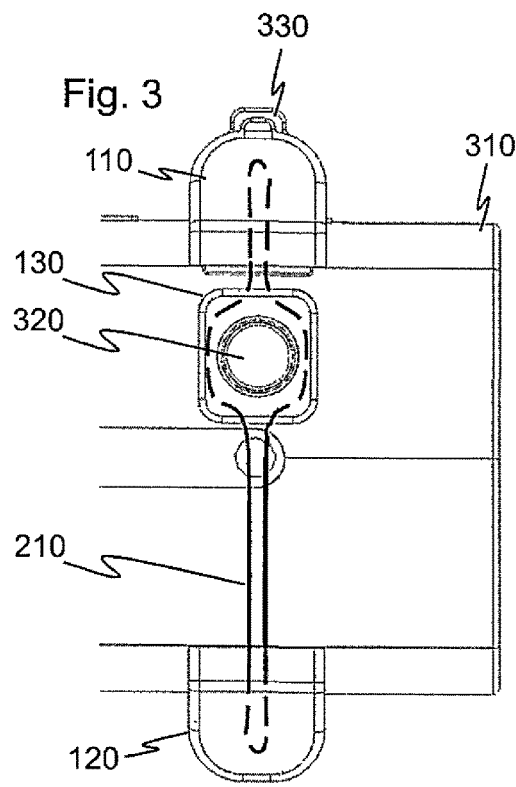
FIGS. 3 and 4 illustrate the apparatus of FIGS. 1 and 2 in the expanded configuration when attached to a portable device and with different positioning of an accessory device against the portable device.
Figure 4:
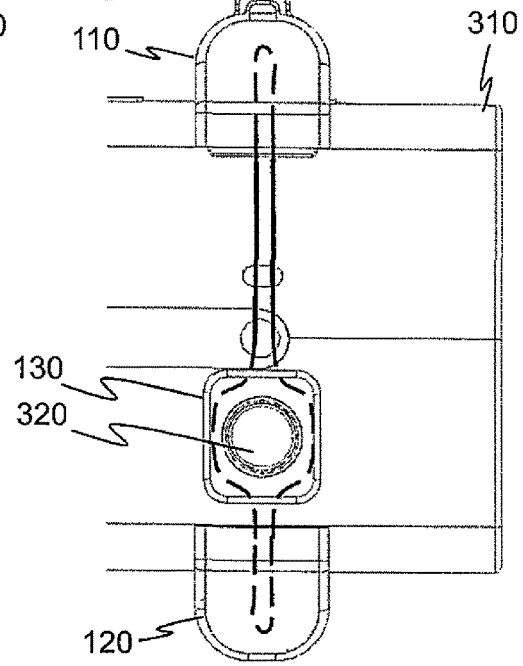

FIGS. 3 and 4 illustrate the apparatus of FIGS. 1 and 2 in the expanded configuration when attached to a first portable device 310 and with different positioning of an accessory device 320 against the portable device. FIGS. 3 and 4 show the first portable device only partially in sake of simplicity, while FIGS. 5 and 6 provide further views with the entire first portable 310 device drawn. FIG. 3 also shows by a dashed line how an elastic loop is connected to the clips 110, 120.

In an example embodiment, the accessory device is configured to co-operate with the portable device. In an example embodiment, at least one of the retractable clip tensioner and the accessory device is configured to enable adjustable attachment of the accessory device to the retractable clip tensioner. For example, the accessory device can be adjustably attached to the retractable clip tensioner by forming a loop in only one leg of the elastic band loop 210 shown in FIG. 1 directly around the accessory device and by sliding the loop in the clips 110, 120. FIGS. 1 to 5 and 7 illustrate another implementation in which the accessory device holder 130 is provided to hold the accessory device 320 and to adjustably attach the accessory device 320 against the portable device.

In an example embodiment, the clips 110, 120 comprise a concave forms configured to sandwich the portable device when the clips 110, 120 are expanded and engaged against the different sides of the portable device. The clips can be formed to have, for example, a C or J shaped profile. The accessory device can be configured to form with the clips 110, 120 a closed exterior surface when the clips 110, 120 are joined and the accessory device is contained in the storage space.

In an example embodiment, the retractable clip tensioner 210 comprises an elastic member. The elastic member comprises e.g. one or more of: an elastic band; a spring; a string; a magnet; and a gas compression based resilient element (e.g. pressurized bag or piece of foam configured to resiliently pass tension between engaging surfaces of the clips 110,120). In an example embodiment, the elastic member comprises more than 50% of its weight of any of: rubber; synthetic rubber; silicone rubber; and spring steel. In an example embodiment, the elastic member comprises a stretching member. In an example embodiment, the stretching member is length-adjustable.

The retractable clip tensioner 210 can be further configured to enable user adjustable positioning of the accessory device 320 at different positions along the retractable clip tensioner 210. In an example embodiment, the retractable clip tensioner 210 is configured to enable user adjustable positioning of the accessory device at different positions by sliding the accessory device along the retractable clip tensioner 210. For example, the accessory device holder 130 can be moved linearly around the stretchable band and the band be configured to compress the accessory device by its sides. To this end, the accessory device holder 130 can be provided with suitable stretchable band conducting members such as channels along both sides of the accessory device holder 130. This way adjustability and holding force for the accessory device holder 130 can be produced such that compatibility is attained with many types of accessory devices and portable devices.

In an example embodiment, the retractable clip tensioner 210 is further configured to inhibit free sliding of the accessory device along the clip tensioner 210. Free sliding may refer to sliding in normal use as function of gravity and accelerations invoked by normal use.

In an example embodiment, the accessory device comprises a functional part. The functional part can be configured to provide a new function or to facilitate the use of an existing function of the portable device. The functional part can be an add-on part. In an example embodiment, the functional part is configured to co-operate with a camera lens of the portable device. In an example embodiment, the functional part comprises one or more elements selected from a group consisting of: an objective; an optical filter; a neutral density filter; a gradient filter; a polarizing filter; a light guide for passing flash light; a mirror or prism for guiding flash light; optically transparent gel for facilitating objective tilting; an objective cover; a sun glare protector; a touch screen stylus; an input device such as a joystick and a spare part for the retractable clip tensioner.

It should be appreciated that while only one display is drawn in FIGS. 5 and 6, for example, the apparatus 100 of FIG. 1 can also be used with a portable device having a plurality of displays on one or more sides. Moreover, more than one apparatus 100 of FIG. 1 can be simultaneously used.

In an example embodiment, the accessory device is configured to enable attaching the functional part at adjustable distance from the portable device. The accessory device can be configured to hold the functional part in a user selectable orientation. For example, the accessory device can be configured to be attachable to the portable device in a respectively user selectable orientation so that the distance of the functional part from the portable device is user adjustable by adjusting the orientation of the accessory device with respect to the portable device.

In an example embodiment, the apparatus 100 further comprises the accessory device 320. In an example embodiment, the apparatus 100 further comprises a plurality of accessory devices 320. In an example embodiment, the apparatus 100 further comprises one or more accessory device storage positions. The storage positions can be formed, for example, in any one or more of: clip 110; clip 120; and the accessory device holder 130.

In an example embodiment, any one or more of the clips 110, 120 are formed of plastics; metal; composite material; glass; rubber; and any combination thereof. Moreover, one or more of the clips 110, 120 can be transparent.

In an example embodiment, one or more of the clips 110, 120 is configured to leave a space for a key or button on the side of the portable device to avoid undesirably acting on the key or button when the clip is engaged against the side of the portable device at the key or button. See e.g. the top of the first portable device 310 as shown in FIGS. 6 and 7: there are buttons that slightly protrude from a side of the first portable device 310 and the clip 110 has a corresponding groove or recess to avoid engaging with such a button. Alternatively or additionally the apparatus 100 can be configured to enable diagonal use of the retractable clip tensioner 210 so as to enable a user to engage the clip against the side of the portable device at a position in which the key or button is not covered by the clip and to enable correct positioning of the accessory device by suitably positioning a clip on another side of the portable device. For example, looking at FIG. 6, the clip 11 could be slightly offset to the right-hand direction in between the entirely visible centrally positioned button and the button that is nearly concealed by the clip 110. In compensation, the clip on the bottom could be suitably offset to left-hand side direction so that the accessory device would settle and be securely held at desired position against the first portable device 310.

In an example embodiment, the clips comprise a friction enhancing shape to inhibit sideways slipping. For example, the clips can be shaped to wedge against the side of the portable device to inhibit sideways slipping. For example, FIG. 7 illustrates how the clip 110 would wedge against the edge of the first portable device 310 because of the mutual shapes of the edge and of the clip 310.

In an example embodiment, the apparatus 100 is configured to enable attaching the portable device to another object e.g. using a loop 330 formed in the clip 110. The another object can be selected, for example, from a group consisting of: a camera cradle; a neck strap; a car cradle; and a table-top device holder.

FIG. 8 shows the apparatus 100 attached to another type of camera equipped mobile phone (second portable device 810). The second portable device 810 has a slightly protruding area at a region of its built-in camera. Such a design is sometimes used to enable building a thin device with high-quality objective that has optical image stabilization. However, it is apparent that such design would also make it difficult to engage an accessory device such as an add-on objective or filter solely with rigid parts. Thanks to the flexible nature of the apparatus of FIG. 1, the slight protrusion only enhances the attachment of the accessory device against the second portable device.

Different embodiments of the present invention find a wide range of possible applications. For example, the portable device can be freely selected from two or more devices of: mobile telephones; personal digital assistants; digital cameras; tablet computers; laptop computers; game devices; and navigation devices. In an example embodiment, the portable device is a handheld device. The portable device can be a battery operated device and/or a wireless communication device.

Figure 9:
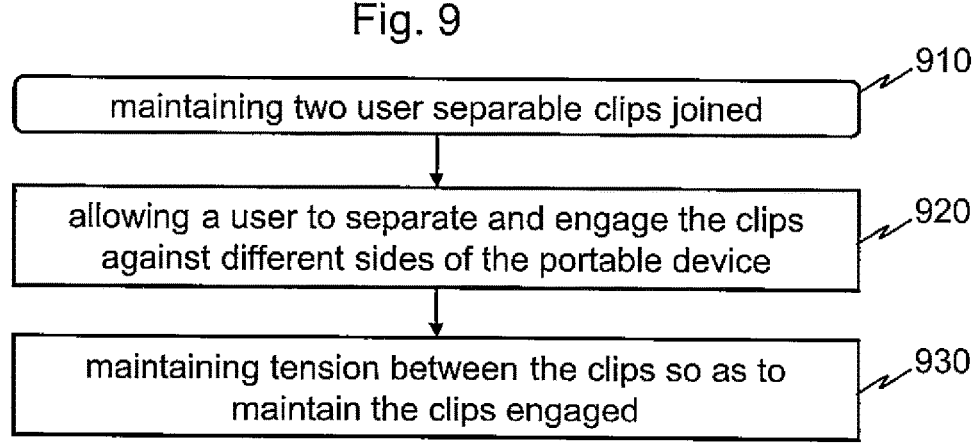
FIG. 9 shows a method of an example embodiment.

FIG. 9 shows a method of an example embodiment, comprising: maintaining 910 two user separable clips joined; allowing 920 a user to separate and engage the clips against different sides of the portable device; and maintaining 930 tension between the clips so as to maintain the clips engaged.

The maintaining 930 of the tension between the clips may be performed using a stretching band. The stretching band may be configured to slide through or around the accessory device when the user adjusts the positioning of the accessory device so as to allow lengthwise adjustment and to generate desired restraining force (e.g. due to friction and compression of the band).

Without in any way limiting the scope, interpretation, or application of the claims appearing below, a technical effect of one or more of the example embodiments disclosed herein is that the apparatus may avoid leaving the accessory device unprotected from dust and scratches when not being used on the portable device. Another technical effect of one or more of the example embodiments disclosed herein is that an accessory device of rather simple construction can be easily and universally attached to different portable devices of various make and model without model specific adaptation. Yet another technical effect of one or more of the example embodiments disclosed herein is that the apparatus may avoid the need to run a rubber band or another loop around the portable device and thus the apparatus may avoid blocking or interfering a display or access to a touch screen or buttons when the accessory device is attached to the portable device. Yet another technical effect of one or more of the example embodiments disclosed herein is that the apparatus may be readily used with both left-handed and right-handed users. Yet another technical effect of one or more of the example embodiments disclosed herein is that the apparatus may avoid the need for magnet based retention systems that may adversely affect on functioning of the portable device such as camera autofocus and electrical signaling due to electromagnetic self-induction that is likely to happen when bringing a strong magnet near electronic circuitries.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   an accessory device;
   two user separable and joinable clips;
   a retractable clip tensioner; and
   an accessory device holder mechanically inter-connecting the accessory device with the retractable clip tensioner, wherein the retractable clip tensioner connects each of the two user separable and joinable clips to the accessory device holder,
   wherein, the retractable clip tensioner enables a user to attach the apparatus against a first side of a portable electronic device by expanding and engaging the clips against different other sides of the portable electronic device so that the retractable clip tensioner maintains the clips engaged;
   wherein, when the clips are connected to each other in a closed configuration, the clips collectively form a storage space containing the accessory device therein, and wherein the clips form a closed exterior surface covering a majority of a front face of the accessory device.

2. The apparatus of claim 1, wherein the accessory device holder enables adjustable attachment of the accessory device to the retractable clip tensioner.

3. The apparatus of claim 2, wherein the accessory device holder comprises channels along both sides of the accessory device holder, and wherein the retractable clip tensioner slides through the channels of the accessory device holder to enable the adjustable attachment of the accessory device to the retractable clip tensioner.

4. The apparatus of claim 1, wherein the accessory device is configured to co-operate with the portable electronic device.

5. The apparatus of claim 4, wherein the accessory device is a camera accessory that co-operates with a camera lens of the portable electronic device.

6. The apparatus of claim 1, wherein at least one of the retractable clip tensioner and the accessory device is configured to enable adjustable attachment of the accessory device to the retractable clip tensioner.

7. The apparatus of claim 1, wherein the clips comprise concave forms configured to sandwich the portable electronic device when the clips are separated and engaged against the different other sides of the portable electronic device.

8. The apparatus of claim 1, wherein the retractable clip tensioner comprises an elastic band.

9. The apparatus of claim 1, further configured to enable user adjustable positioning of the accessory device at different positions of the retractable clip tensioner.

10. The apparatus of claim 1, further configured to enable attaching the accessory device at adjustable distance from the portable electronic device.

11. The apparatus of claim 1, wherein the accessory device holder comprises one or more user replaceable accessory devices.

12. The apparatus of claim 1, wherein any one or more of the clips is formed of plastics; metal; composite material; glass; rubber; or any combination thereof.

13. The apparatus of claim 1, wherein one or more of the clips comprises a space for a key or button on the respective different other side of the portable electronic device to avoid undesirably acting on the key or button when the one or more of the clips is engaged against the respective different other side of the portable electronic device at the key or button.

14. The apparatus of claim 1, further configured to enable attaching the portable electronic device to another object.

15. The apparatus of claim 1, wherein the portable electronic device is at least one of: a mobile telephone; a personal digital assistant; a digital camera; a tablet computer; a laptop computer; a game device; or a navigation device.

16. The apparatus of claim 1, wherein each of the two user separable and joinable clips have a 'C' shaped or 'J' shaped profile, wherein concave sides of the two clips are inwardly facing.

17. A system comprising the apparatus of claim 1 and the portable electronic device.

18. An apparatus comprising:
an accessory device,
two user separable and joinable clips; and
a retractable clip tensioner; and
an accessory device holder mechanically inter-connecting the accessory device with the retractable clip tensioner, wherein the retractable clip tensioner connects each of the two user separable and joinable clips to the accessory device holder, and wherein the retractable clip tensioner enables a user to attach the apparatus against a first side of an electronic portable device by expanding and engaging the clips against different other sides of the portable electronic device so that the retractable clip tensioner maintains the clips engaged;
wherein, when the clips are connected to each other in a closed configuration, the clips collectively form, when joined, a storage space for the accessory device, and wherein the accessory device comprises one or more items selected from a group consisting of: an objective; an optical filter; a neutral density filter; a gradient filter; a polarizing filter; a light guide for passing flash light; a mirror or prism for guiding flash light; optically transparent gel for facilitating objective tilting; an objective cover; a sun glare protector; a touch screen stylus; a spare part for the retractable clip tensioner; an input device; and a joystick.

* * * * *